United States Patent
Shanthaveerappa et al.

(10) Patent No.: US 10,579,478 B2
(45) Date of Patent: Mar. 3, 2020

(54) PLUGGABLE DATABASE ARCHIVE

(71) Applicant: Oracle International Corporation, Redwood Shores, CA (US)

(72) Inventors: Prashanth Shanthaveerappa, San Mateo, CA (US); Giridhar Ravipati, Foster City, CA (US); Margaret Susairaj, Sugar Land, TX (US); Kumar Rajamani, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 77 days.

(21) Appl. No.: 15/244,867

(22) Filed: Aug. 23, 2016

(65) Prior Publication Data

US 2018/0060177 A1  Mar. 1, 2018
US 2020/0026608 A9  Jan. 23, 2020

Related U.S. Application Data

(60) Provisional application No. 62/245,937, filed on Oct. 23, 2015.

(51) Int. Cl.
*G06F 17/30* (2006.01)
*G06F 11/14* (2006.01)
(Continued)

(52) U.S. Cl.
CPC ...... *G06F 11/1451* (2013.01); *G06F 11/1458* (2013.01); *G06F 16/113* (2019.01);
(Continued)

(58) Field of Classification Search
CPC ......... G06F 17/30575; G06F 17/30289; G06F 17/30563; G06F 17/30283; G06F 17/30377
See application file for complete search history.

(56) References Cited

U.S. PATENT DOCUMENTS 6,185,699 B1  2/2001  Haderle
6,205,449 B1  3/2001  Rastogi
(Continued)

OTHER PUBLICATIONS

U.S. Appl. No. 14/202,091, filed Mar. 10, 2014, Notice of Allowance, dated Feb. 26, 2016.
(Continued)

*Primary Examiner* — Daniel A Kuddus
(74) *Attorney, Agent, or Firm* — Hickman Palermo Becker Bingham LLP; Brian N. Miller

(57) ABSTRACT

Techniques herein make and use a pluggable database archive file (AF). In an embodiment, a source database server of a source container database (SCD) inserts contents into an AF from a source pluggable database (SPD). The contents include data files from the SPD, a listing of the data files, rollback scripts, and a list of patches applied to the SPD. A target database server (TDS) of a target container database (TCD) creates a target pluggable database (TPD) based on the AF. If a patch on the list of patches does not exist in the TCD, the TDS executes the rollback scripts to adjust the TPD. In an embodiment, the TDS receives a request to access a block of a particular data file. The TDS detects, based on the listing of the data files, a position of the block within the AF. The TDS retrieves the block based on the position.

19 Claims, 6 Drawing Sheets

(51) Int. Cl.
*G06F 16/21* (2019.01)
*G06F 16/11* (2019.01)

(52) U.S. Cl.
CPC .......... *G06F 16/21* (2019.01); *G06F 11/1482* (2013.01); *G06F 2201/80* (2013.01)

(56) References Cited

U.S. PATENT DOCUMENTS

| | | | |
|---|---|---|---|
| 6,226,650 | B1 | 5/2001 | Mahajan |
| 6,295,610 | B1 | 9/2001 | Ganesh |
| 6,502,102 | B1* | 12/2002 | Haswell ............ G06F 11/3664 |
| 6,633,878 | B1* | 10/2003 | Underwood .......... G06Q 10/10 |
| 6,638,878 | B2* | 10/2003 | Restaino ........... H01L 21/31051 438/782 |
| 6,804,671 | B1 | 10/2004 | Loaiza et al. |
| 6,973,647 | B2* | 12/2005 | Crudele ................ G06F 8/61 717/177 |
| 7,136,857 | B2* | 11/2006 | Chen ..................... G06F 8/60 |
| 7,305,421 | B2 | 12/2007 | Cha |
| 7,418,435 | B1* | 8/2008 | Sedlar ................ G06F 16/188 |
| 7,571,173 | B2* | 8/2009 | Yang .................. G06F 16/258 |
| 7,620,620 | B1* | 11/2009 | Sedlar ................ G06F 16/188 |
| 7,822,717 | B2 | 10/2010 | Kappor et al. |
| 8,061,085 | B2* | 11/2011 | Anderson ........... E04F 11/1863 52/182 |
| 8,065,320 | B2* | 11/2011 | Sedlar ................ G06F 16/188 707/769 |
| 8,117,174 | B2 | 2/2012 | Shaughessey |
| 8,161,085 | B2* | 4/2012 | Souder ............... G06F 16/2386 707/825 |
| 8,364,648 | B1 | 1/2013 | Sim-Tang |
| 8,478,718 | B1 | 7/2013 | Ranade |
| 8,554,762 | B1 | 10/2013 | O'Neill |
| 9,026,679 | B1 | 5/2015 | Shmuylovich |
| 9,280,591 | B1 | 3/2016 | Kharatishvili |
| 9,298,564 | B2* | 3/2016 | Lee ..................... G06F 11/1471 |
| 9,390,120 | B1 | 7/2016 | Gulliver |
| 9,396,220 | B2* | 7/2016 | Li ....................... G06F 16/214 |
| 9,507,843 | B1 | 11/2016 | Madhavarapu |
| 9,684,561 | B1 | 6/2017 | Yan |
| 2002/0112022 | A1* | 8/2002 | Kazar ................. G06F 16/1824 709/217 |
| 2002/0143733 | A1 | 10/2002 | Mukkamalla |
| 2003/0050932 | A1* | 3/2003 | Pace ..................... G06F 8/60 |
| 2003/0061537 | A1 | 3/2003 | Cha et al. |
| 2003/0074360 | A1* | 4/2003 | Chen .................... G06F 8/60 |
| 2004/0039962 | A1 | 2/2004 | Ganesh |
| 2004/0054643 | A1 | 3/2004 | Vermuri |
| 2004/0054644 | A1 | 3/2004 | Ganesh |
| 2004/0177099 | A1 | 9/2004 | Ganesh |
| 2004/0210577 | A1 | 10/2004 | Kundu |
| 2004/0267809 | A1 | 12/2004 | East et al. |
| 2005/0038831 | A1 | 2/2005 | Souder et al. |
| 2005/0256908 | A1* | 11/2005 | Yang .................. G06F 16/258 |
| 2005/0283478 | A1 | 12/2005 | Choi |
| 2006/0047626 | A1 | 3/2006 | Raheem |
| 2006/0047713 | A1 | 3/2006 | Gornshtein |
| 2007/0083563 | A1 | 4/2007 | Souder |
| 2007/0100912 | A1* | 5/2007 | Pareek ............... G06F 11/1466 |
| 2007/0244918 | A1 | 10/2007 | Lee et al. |
| 2009/0282203 | A1 | 11/2009 | Haustein |
| 2010/0318570 | A1 | 12/2010 | Narasinghanallur et al. |
| 2011/0004586 | A1 | 1/2011 | Cherryholmes et al. |
| 2011/0060724 | A1 | 3/2011 | Chan |
| 2011/0087633 | A1 | 4/2011 | Kreuder et al. |
| 2011/0307450 | A1* | 12/2011 | Hahn ................. G06F 16/2282 707/649 |
| 2012/0109926 | A1 | 5/2012 | Novik et al. |
| 2012/0284228 | A1 | 11/2012 | Ghosh |
| 2012/0287282 | A1 | 11/2012 | Lu |
| 2012/0323849 | A1 | 12/2012 | Garin |
| 2013/0085742 | A1 | 4/2013 | Baker et al. |
| 2013/0117237 | A1 | 5/2013 | Thomsen et al. |
| 2013/0198133 | A1 | 8/2013 | Lee |
| 2013/0212068 | A1 | 8/2013 | Talius et al. |
| 2014/0095452 | A1 | 4/2014 | Lee et al. |
| 2014/0095530 | A1 | 4/2014 | Lee et al. |
| 2014/0095546 | A1 | 4/2014 | Kruglikov et al. |
| 2014/0164331 | A1 | 6/2014 | Li et al. |
| 2014/0188804 | A1 | 7/2014 | Gokhale |
| 2014/0258241 | A1 | 9/2014 | Chen |
| 2015/0120659 | A1 | 4/2015 | Srivastava |
| 2015/0120780 | A1 | 4/2015 | Jain |
| 2015/0254240 | A1 | 9/2015 | Li et al. |
| 2015/0370641 | A1 | 12/2015 | Susairaj |
| 2016/0188621 | A1 | 6/2016 | Karinta et al. |
| 2017/0116207 | A1 | 4/2017 | Lee |
| 2017/0116213 | A1 | 4/2017 | Jain |
| 2017/0116298 | A1 | 4/2017 | Ravipati |
| 2017/0315877 | A1 | 11/2017 | Kaplingat |

OTHER PUBLICATIONS

U.S. Appl. No. 13/830,349, filed Mar. 14, 2013, Office Action, dated Nov. 5, 2014.
U.S. Appl. No. 13/830,349, filed Mar. 13, 2013, Notice of Allowance, dated Oct. 19, 2015.
U.S. Appl. No. 13/830,349, filed Mar. 13, 2013, Interview Summary, dated Mar. 9, 2015.
U.S. Appl. No. 13/830,349, filed Mar. 14, 2013, Final Office Action, dated Jun. 2, 2015.
U.S. Appl. No. 13/613,815, filed Sep. 28, 2012, Office Action, dated Nov. 6, 2014.
U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed Sep. 28, 2012, Office Action, dated Dec. 23, 2013.
U.S. Appl. No. 13/631,815, filed Sep. 28, 2012, Office Action, dated May 29, 2014.
Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip"Oracle, dated Sep. 20, 2012, 2 pages.
Oracle Base, Multitenant: Create and Configure a Pluggable Database (PDB)In Oracle Database 12c Release 1 (12.1), dated Jan. 8, 2014, 16 pages.
Muhammad Anwar, "How to Install Oracle 12c Multitenant Pluggable Database", dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Susairaj, U.S. Appl. No. 15/226,340, filed Sep. 15, 2016, Office Action, dated Oct. 30, 2018.
Ravipati, U.S. Appl. No. 15/215,443, filed Jul. 20, 2016, Office Action, dated Sep. 19, 2018.
Rajamani, U.S. Appl. No. 15/254,884, filed Sep. 1, 2016, Interview Summary, dated Sep. 24, 2018.
Lee, U.S. Appl. No. 15/215,446, filed Jul. 20, 2016, Restrcition Requirement, dated Oct. 1, 2018.
Lee, U.S. Appl. No. 15/215,446, filed Jul. 20, 2016, Office Action, dated Nov. 16, 2018.

(56) References Cited

OTHER PUBLICATIONS

Kruglikov, U.S. Appl. No. 15/266,902, filed Sep. 15, 2016, Interview Summary, dated Oct. 1, 2018.
Rajamani, U.S. Appl. No. 15/254,884, filed Sep. 1, 2016, Office Action, dated Jun. 27, 2018.
Kruglikov, U.S. Appl. No. 15/266,902, filed Sep. 15, 2016, Office Action, dated Aug. 6, 2018.
Susairaj, U.S. Appl. No. 15/266,340, filed Sep. 15, 2016, Interview Summary, dated Jan. 3, 2019.
Ravipati, U.S. Appl. No. 15/215,443, filed Jul. 20, 2016, Interview Summary, dated Jan. 4, 2019.
Rajamani, U.S. Appl. No. 15/254,884, filed Sep. 1, 2016, Final Office Action, dated Nov. 21, 2018.
Sata's DBA Blog: "Oracle Statistics", dated Jan. 3, 2013, http://satya-dba.blogspot.com/2010/06/oracle-database-statistics-rbo-cbo.html, 14 pages.
Ravipati, U.S. Appl. No. 15/215,443, filed Jul. 20, 2016, Advisory Action, dated Jun. 5, 2019.
Ravipati, U.S. Appl. No. 15/215,443, filed Jul. 20, 2016, Office Action, dated Jul. 18, 2019.
Lee, U.S. Appl. No. 15/215,446, filed Jul. 20, 2016, Advisory Action, dated Jun. 4, 2019.
Jain, U.S. Appl. No. 15/093,506, filed Apr. 7, 2016, Interview Summary, dated Jul. 8, 2019.

* cited by examiner

PLUGGABLE DATABASE ARCHIVE

CROSS-REFERENCE TO RELATED APPLICATIONS

This application claims the benefit of Provisional Appln. 62/245,937, filed Oct. 23, 2015, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s). This application is related to the following applications, each of which is incorporated by reference as if fully set forth herein:

- application. Ser. No. 13/631,815, filed Sep. 28, 2012, titled "Container Database";
- U.S. Pat. No. 9,298,564, filed Mar. 14, 2013, titled "In Place Point-In-Time Recovery Of Pluggable Databases";
- application. Ser. No. 14/202,091, filed Mar. 10, 2014, titled "Instantaneous Unplug Of Pluggable Database From One Container Database And Plug Into Another Container Database";
- application. Ser. No. 15/093,506, filed Apr. 7, 2016, titled "Migrating A Pluggable Database Between Database Server Instances With Minimal Impact To Performance";
- application. Ser. No. 15/215,443, filed Jul. 20, 2016, titled "Techniques For Keeping A Copy Of A Pluggable Database Up To Date With A Source Pluggable Database In Read-Write Mode"; and
- application. Ser. No. 15/215,446, filed Jul. 20, 2016, titled "Near-zero Downtime Relocation of a Pluggable Database across Container Databases".

FIELD OF THE DISCLOSURE

This disclosure relates to database relocation for multitenant database systems. Techniques are presented for making and using an archive file for a pluggable database.

BACKGROUND

Database consolidation involves distributing and sharing computing resources among multiple databases managed by one or more database servers of database management systems (DBMS). Databases may be consolidated using a container DBMS. A consolidated database, such as a multitenant container database (CDB), includes one or more pluggable databases (PDBs). In a container DBMS, each pluggable database may be open or closed in the container database independently from other pluggable databases.

Pluggable databases may be "plugged in" to a container database, and may be transported between database servers and/or DBMSs. The container DBMS may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases.

An application may access a pluggable database by establishing a database session on the container DBMS for that pluggable database, where a database session represents the connection between an application and the container DBMS for accessing the pluggable database. A database session is initiated for a pluggable database by, for example, transmitting a request for a new connection to the container DBMS, the request specifying the pluggable database. A container DBMS may host multiple database sessions, each database session being for one of multiple pluggable databases.

One of the big advantages of container database architecture is the ability to provision new databases quickly.

Moving a PDB between container databases presents various problems. For example, moving the data for a PDB from a source CDB to a destination CDB can take a significant amount of time (i.e., on the order of days for very large PDBs). It is also costly to make a PDB unavailable for the duration of moving the PDB. Also, relocating a PDB to a destination CDB can be disruptive to users that use data from the PDB at the source CDB.

Generally, moving the files for a PDB between container DBMSs may be accomplished in multiple ways, including: copying the files to an external hard drive and physically moving the hard drive to the location of the destination storage, setting up an auxiliary DBMS that leverages replication to synchronize changes across container databases, and live migration of virtual machines from one physical server to another.

The architecture of a container DBMS greatly facilitates transporting databases between database servers and/or DBMSs. Tablespace files and a data dictionary store may be moved between environments of container DBMSs using readily available mechanisms for copying and moving files. The tablespace files, along with one or more dictionary files, are referred to herein collectively as a transportable database package. However, a transportable database package is a logical set of loose files, which may be difficult to identify and manage.

Once the transportable database package of a pluggable database is moved to the environment of the target container DBMS, the pluggable database can be plugged into the target container DBMS. In an embodiment, plugging in the pluggable database is performed in response to receiving a DDL command to plug in the pluggable database, the DDL command also identifying the transportable database package. In response to receiving the DDL command, the container DBMS plugs in the pluggable database. Plugging in the pluggable database entails such operations as updating a root database dictionary to define the pluggable database, such updates including, for example, adding a record to a metadata table. Error checking is also performed. For example, checks are performed to ensure that the name of the pluggable database is unique within the container DBMS and that tablespace files are not already being used for other tablespaces in the container DBMS.

A container DBMS provides advantages for database consolidation. Among such advantages is providing a high degree of isolation concurrently along with a high degree of resource sharing. Multiple pluggable databases may run on the same database server and/or database server instance, allowing the computing resources of a single database server or instance to be shared between multiple pluggable databases.

However, copying and moving pluggable databases may introduce complexity. For example, the loose files to transfer and other manual steps needed to copy or move a pluggable database may be unclear or otherwise error prone for a database administrator.

Furthermore, the infrastructural fabric of a data grid may be a diverse ecosystem with many container databases. Not all container databases may be compatible with a given pluggable database. For example, the release version and patch level of container databases may be so discrepant that portability of a pluggable database between incompatible container databases may be lost or limited.

Furthermore, container databases readily accept installations of pluggable databases, which encourages distributed deployment, replication, horizontal scaling, and bulk deployment throughout a cluster. As such, pluggable databases may benefit from a content format that is durable and eases installation.

Furthermore, a pluggable database may be huge, and a container database may contain thousands of pluggable databases. A content format for pluggable databases should encourage huge datasets.

Furthermore, a copied or moved pluggable database may have a lifecycle of its own that includes subsequent evolution (modification) of content. A pluggable database should accommodate such change.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer System
　2.1 Container Database
　2.2 Pluggable Database
　2.3 Archive File
　2.4 Installing From Archive
　2.5 Patch List
　2.6 Rollback Script
3.0 Archive Process
4.0 Random Access Into Archive
　4.1 Write Access 5.0 Random Access Process
6.0 Compression
7.0 Hardware Overview 1.0 General Overview Techniques are provided for making and using an archive file for a pluggable database. In an embodiment, a source database server of a source container database inserts contents from a source pluggable database of the source container database into an archive file. The contents include data files that contain database objects such as records from the source pluggable database, a manifest file that lists the data files, rollback scripts, and a list of patches that were applied to the source pluggable database. A target database server of a target container database creates a target pluggable database of the target container database based on the archive file. If a patch, which is on the list of patches, does not exist in the target container database, then the target database server executes, at least one of the one or more rollback scripts to adjust the target pluggable database to make the target pluggable database backward compatible with the target container database.

In an embodiment, the target pluggable database is created based on an archive file that contains data files, which contain records, and a manifest file that lists the data files. The target database server receives a request to access a particular data block of a particular data file of the data files. The target database server detects, based on the manifest file, a position of the particular data block within the archive file. The target database server retrieves, based on the position, the particular data block from within the archive file.

2.0 Example Computer System

Figure 1:
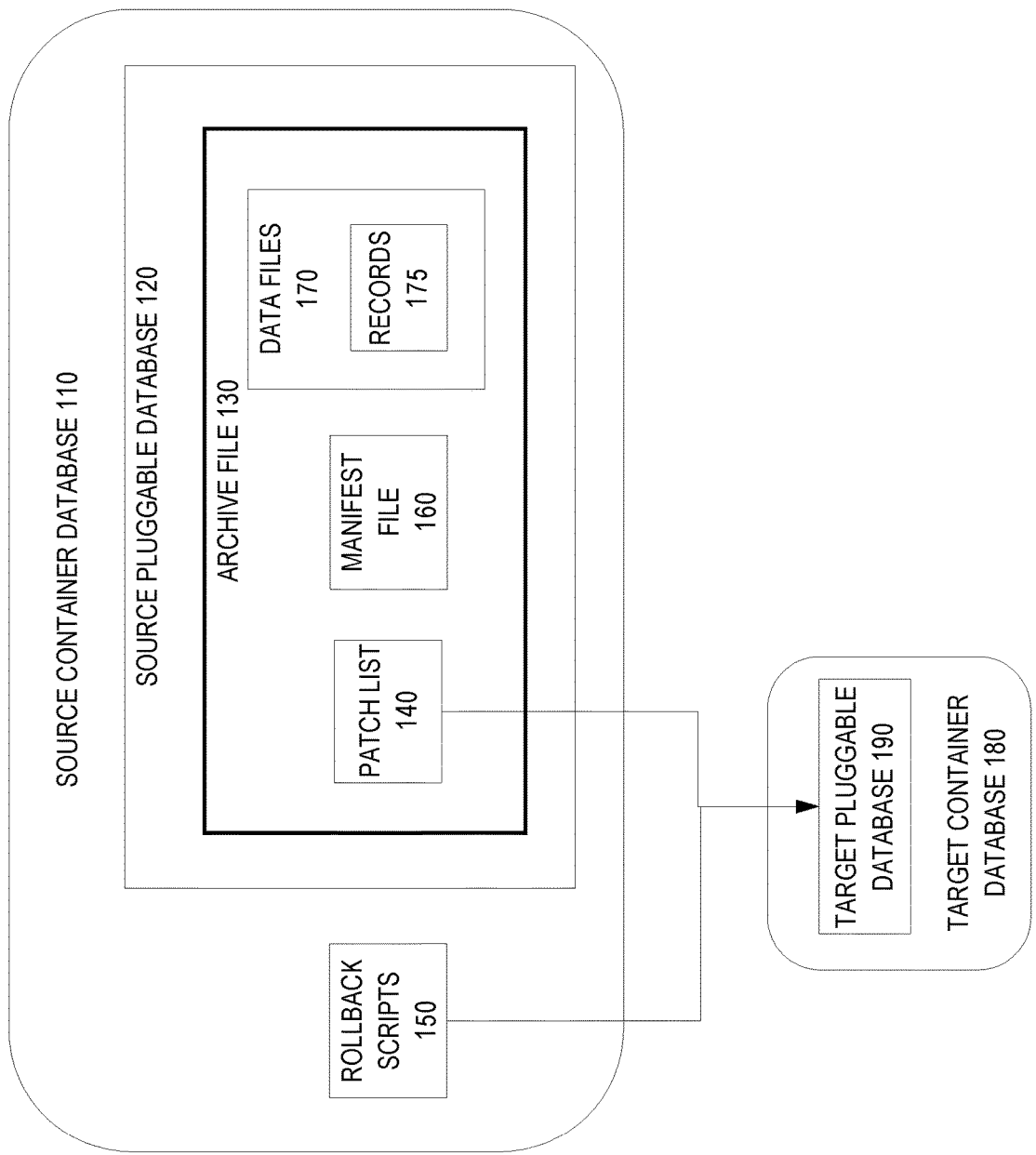
FIG. 1 is a block diagram that depicts an example computer that adjusts a pluggable database according to rollback scripts, in an embodiment.

FIG. 1 is a block diagram that depicts an example computer system 100, in an embodiment. Computer system 100 creates and uses a self-contained archive file to create a pluggable database that is adjusted according to rollback scripts.

Computer system 100 may be composed of one or more computers, including rack servers such as blades, personal computers, mainframes, smartphones, networked appliances, virtual machines, or other computing devices. Computer system 100 may access data that is stored in memory, on disks, or over a network.

2.1 Container Database

Computer system 100 hosts a source database server that includes source container database 110. Source database server may be a relational database management system (RDBMS) or other database software instance that is capable of hosting a container database that may have multiple pluggable databases.

Source container database 110 contains file resources, such as executables, that provide infrastructural features to the pluggable databases within source container database 110. An enterprise may deploy multiple container databases and maintain them at different patch levels.

2.2 Pluggable Database

Source container database 110 includes one or more pluggable databases, such as 120. Pluggable database 120 may be an independent database that may be moved or copied from one container database to another. For example, source pluggable database 120 may contain a schema of related tables, such as defined by data definition language (DDL), and their records.

Source pluggable database 120 is tailored to fit source container database 110. For example, scripts, schema, or records of source pluggable database 120 may be tailored to integrate with the versions of files and patches that are part of source container database 110.

2.3 Archive File

For interchange, the source database server may create archive file 130 and copy the contents of source pluggable database 120 into archive file 130. Archive file 130 may be a tar file, a compressed file, or an archive of any format that aggregates multiple files into one file, such as a library file.

Into archive file 130, the source database server writes data files 170 that contain the contents of source pluggable database 120, including schema, tables, and records 175. Any of data files 170 may be tailored to the patch level of source container database 110.

The source database server also writes patch list 140 and manifest file 160 into archive file 130. Manifest file 160 lists the individual files, such as those of 170, that are stored within archive file 130.

2.4 Installing From Archive

In operation, archive file 130 may be imported into a different container database, such as 180, to configure existing or new target pluggable database 190 to be a copy of old source pluggable database 120. However, container databases 110 and 180 may have incompatible patch levels.

For example, some of the software components of a container database may occasionally be replaced with newer (upgraded) versions of the same software, with newer versions having a higher patch level or release number. Either of container databases 110 and 180 may have received a patch (new version) that the other container database did not.

For example, container databases 110 and 180 may have different maintenance schedules or different administrators. For example, source container database 110 may occupy production. Whereas, target container database 180 may be hosted by a target database server that is test infrastructure and that creates target pluggable database 190 to reproduce a bug or other boundary condition that was observed in production.

2.5 Patch List

The target database server may retrieve the contents of patch list 140 from archive file 130. Patch list 140 may record the patches and other file versions that source pluggable database 120 had when archive file 130 was created. In an embodiment, the source database server constructs patch list 140 from patch metadata of a data dictionary of source pluggable database 120.

Patch list 140 may record the maximum and minimum database version or patch level that is acceptable for compatibility by some or all files listed in manifest file 160. The target database server may verify, file by file, that the patch level of source container database 110 does not exceed the patch level of target container database 180 or a maximum patch level specified by patch list 140.

In an embodiment, patch list 140 is contained within manifest file 160. For example, each file entry within manifest file 160 may designate a minimum and maximum patch level or exact patch level for that file.

The target database server may detect that target container database 180 has a particular patch or file version that is newer than what is installed for source container database 110. However, the target database server may ignore a patch or file that, although newer (higher) than a corresponding patch of source container database 110, is older (lower) than a maximum patch level specified by patch list 140.

2.6 Rollback Script

In a embodiment, the target database server may retrieve rollback scripts 150 from a file system of source container database 110. Each rollback script may perform a variety of tasks.

For example, a rollback script may downgrade a particular set of files of target pluggable database 190, such as particular patch, to a particular historical version. A rollback script may alter data, such as by removing a column from a database table.

Each patch that is applied to a container database may include rollback scripts needed to revert (undo) the patch. In an alternate embodiment, rollback scripts 150 may be copied from source container database 110 and included within archive file 130 during creation of archive file 130.

When the target database server detects, based on patch list 140, that target pluggable database 190 contains a file or patch that is too new, then the target database server may consult patch list 140 to detect what subset of scripts of rollback scripts 150 to run to downgrade target pluggable database 190 to a particular historical patch level. For example, each entry within patch list 140 may include the identity of a file or patch, a particular, minimum, or maximum version level, and identifiers that designate which of rollback scripts 150 to run to restore the entry to a backwards-compatible version level. Running some or all of rollback scripts 150 need not cause an exact match of the patch levels of pluggable databases 120 and 190.

For example, rollback scripts 150 may include DDL or data manipulation language (DML) to adjust the contents of target pluggable database 190. For example, DML in rollback scripts 150 may cause restoration of a row of an infrastructural table, such as a data dictionary table, that is present in source container database 110 but was since removed from target container database 180 during an upgrade.

For example, rollback scripts 150 may include DDL that changes the definition of a custom datatype. For example, rollback scripts 150 may include an ALTER TYPE statement of SQL. In another example, DDL in rollback scripts 150 may cause restoration of a column of an infrastructural table, such as a data dictionary table, that is present in source container database 110 but was since removed from target container database 180 during an upgrade.

3.0 Archive Process

Figure 2:
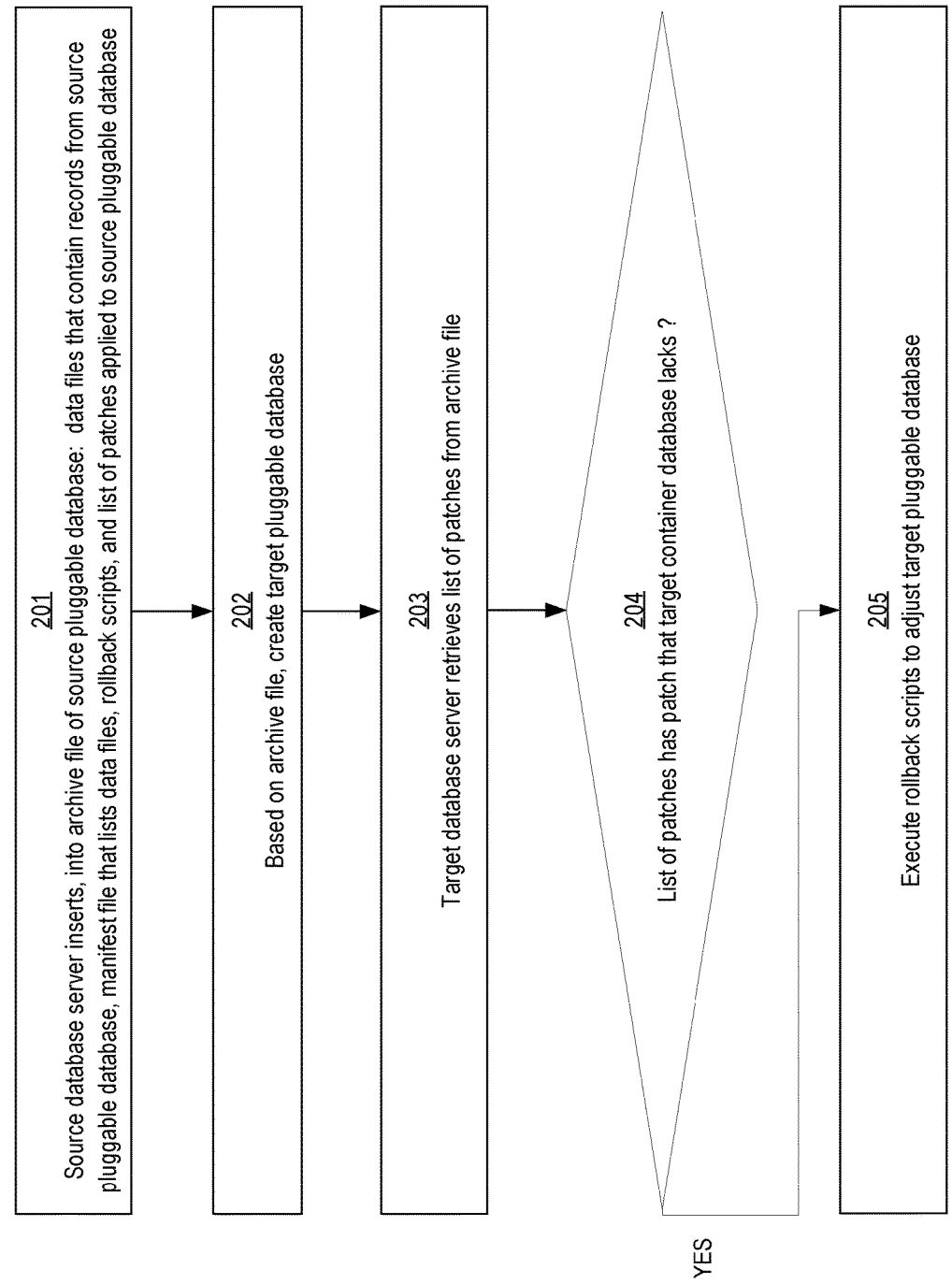
FIG. 2 is a flow diagram that depicts an example process that adjusts a pluggable database according to rollback scripts, in an embodiment.

FIG. 2 is a flow diagram that depicts an example process 200 that creates and uses a self-contained archive file to create a pluggable database that is adjusted according to rollback scripts. FIG. 2 is discussed with reference to FIG. 1.

Step 201 is preparatory. A source database server inserts, into an archive file of a source pluggable database: data files that contain records from the source pluggable database, a manifest file that lists data files, rollback scripts, and a list of patches applied to the source pluggable database.

For example, the source database server may receive a command, such as from an administrator, to export source pluggable database 120 as a new archive file. The source database server may create archive file 130.

The source database server may create manifest file 160 that lists data files 170. The source database server may insert data files 170 and manifest file 160 into archive file 130.

The source database server may create patch list 140 based on which patches and file versions are present in source pluggable database 120. The source database server may incorporate patch list 140 within manifest file 160 or insert patch list 140 into archive file 130 as a separate file.

A file system of source container database 110 may contain rollback scripts 150 that can downgrade a pluggable database, such as 190, to the same patch level as target container database 180. In an embodiment, the source database server may copy rollback scripts 150 into archive file 120.

In step 202 and based on the archive file, the target pluggable database is created. The target pluggable database is recreated if it already exists.

For example, the target database server may receive a command to create target pluggable database 190 from archive file 130. The target database server may copy data or files from archive file 130 into target pluggable database 190 as needed. The target database server may detect that archive file 130 contains scripts that the target database server should run to facilitate initialization of target pluggable database 190.

After step 202, target pluggable database 190 is already populated with data. However there may be a version incompatibility between target pluggable database 190, as initialized, and target container database 180. In other words, target pluggable database 190 might not be ready to use immediately after step 202.

Steps 203-205 downgrade the target pluggable database as needed. In step 203, the target database server retrieves the patch list from the archive file.

For example, target database server may retrieve manifest file 160 from archive file 130. Manifest file 160 may contain patch list 140.

Alternatively, manifest file 160 may indicate which file within archive file 130 is patch list 140. The target database server retrieves whichever file has patch list 140.

In step 204, whether the target container database lacks a patch that is on the patch list is detected. For example for each entry within patch list 140, the target database server may detect whether the patch level or version of designated files of target container database 180 is below the patch level or version of the patch list entry.

Step 205 is performed if step 204 detects that the target pluggable database exceeds the patch level of an entry of the patch list. In step 205, rollback scripts are run to downgrade the target pluggable database.

For example, each entry of patch list 140 may designate a respective subset of rollback scripts 150 to run. The target database server may retrieve the respective subset of rollback scripts and run them.

Execution of these rollback scripts may cause target pluggable database 190 to be selectively and partially downgraded. For example, the rollback scripts need not cause target pluggable database 190 to exactly match the file versions of target container database 180.

Causing target pluggable database 190 to conform to a range or maximum patch level or version may be sufficient. In any case, step 205 causes whatever downgrade of target pluggable database 190 is needed to achieve compatibility with target container database 180. After step 205, compatibility is achieved, and target container database 180 may now functionally host target pluggable database 190 for ordinary usage.

4.0 Random Access into Archive

Figure 3:
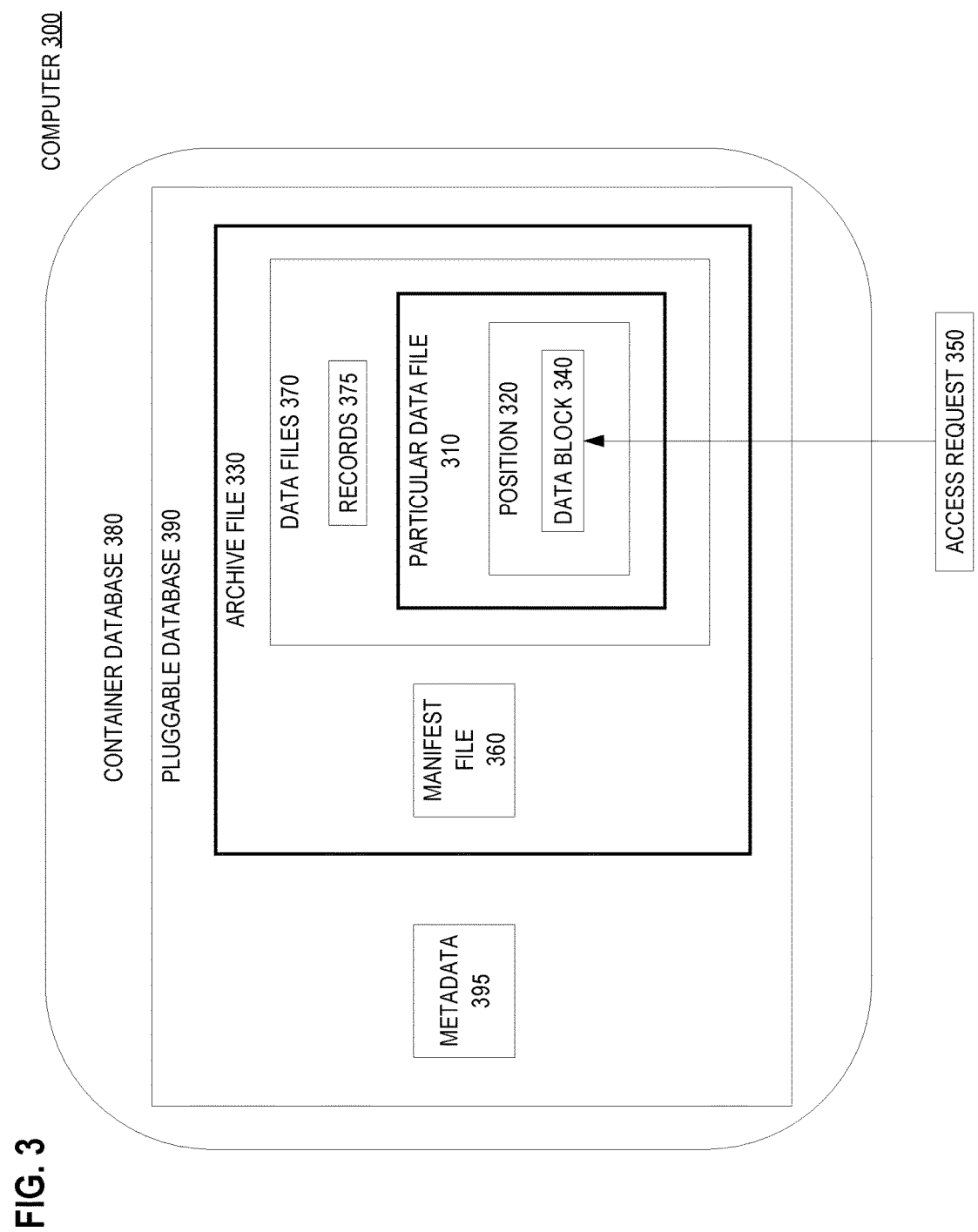
FIG. 3 is a block diagram that depicts an example computer that provides random access into a target pluggable database for data blocks within an archive file, in an embodiment.

FIG. 3 is a block diagram that depicts an example computer 300 that provides random access into a target pluggable database for data blocks within an archive file, in an embodiment. Computer 300 includes a target database server that hosts a target container database 380 which contains target pluggable database 390.

Archive file 330 may be an implementation of archive file 130. Likewise, archive file 330 may be constructed according to step 201 of process 200.

Pluggable database 390 may be an implementation of target pluggable database 190. Likewise, pluggable database 390 may be created from archive file 330 according to steps 202-205.

In operation, the database server may receive access request 350 to access particular data block 340 of particular data file 310. For example, access request 350 may contain an identifier of particular data file 310, such as a file number or a file path.

Likewise, access request 350 may contain an identifier of data block 340, such as a block offset relative to particular data file 310. However after receiving access request 350, the database server may normalize the block offset by shifting its origin from the sequence of blocks of particular data file 310 to the blocks of the whole archive file 330.

Manifest file 360 within archive file 330 may contain the value of the block offset to the beginning of each file of data files 370. For example, access request 350 may specify particular data file 310, and manifest file 360 may indicate that particular data file 310 begins one hundred blocks into archive file 330.

The database server may translate the file-relative block offset of access request 350 into an archive-relative block offset, such as position 320. For example, the target database server may seek within archive file 330 to position 320 to retrieve data block 340.

The database server may perform the block offset translation by adding the block offset of particular data file 310 to the block offset specified by access request 350. For example, particular data file 310 may begin at one hundred blocks into archive file 330, and access request 350 may specify a block offset of fifty blocks.

As such, the value of position 320 may be calculated as 100+50=150. The database server will seek 150 blocks into archive file 330 to read data block 340.

4.1 Write Access

The database server may treat archive file 330 as read only, even though target pluggable database 390 might not be read-only. In an embodiment, access request 350 may be a request to write a data block even though computer 300 will not modify archive file 330.

In an embodiment, the database server handles a request to write a data block by writing the data block into a data file of pluggable database 390 that is not within archive file 330. In an embodiment, pluggable database 390 contains metadata 395 that indicates which data blocks within archive file 330 are superseded (rendered stale) by data blocks within data files that are not within archive file 330.

In an embodiment, metadata 395 comprises a set of identifiers of data blocks that are stale within archive file 330. In an embodiment, metadata 395 comprises a bitmap.

Each bit of the bitmap corresponds to a respective data block within archive file 330. The value of each bit indicates whether the respective data block for the bit is or is not stale within archive file 330.

5.0 Random Access Process

Figure 4:
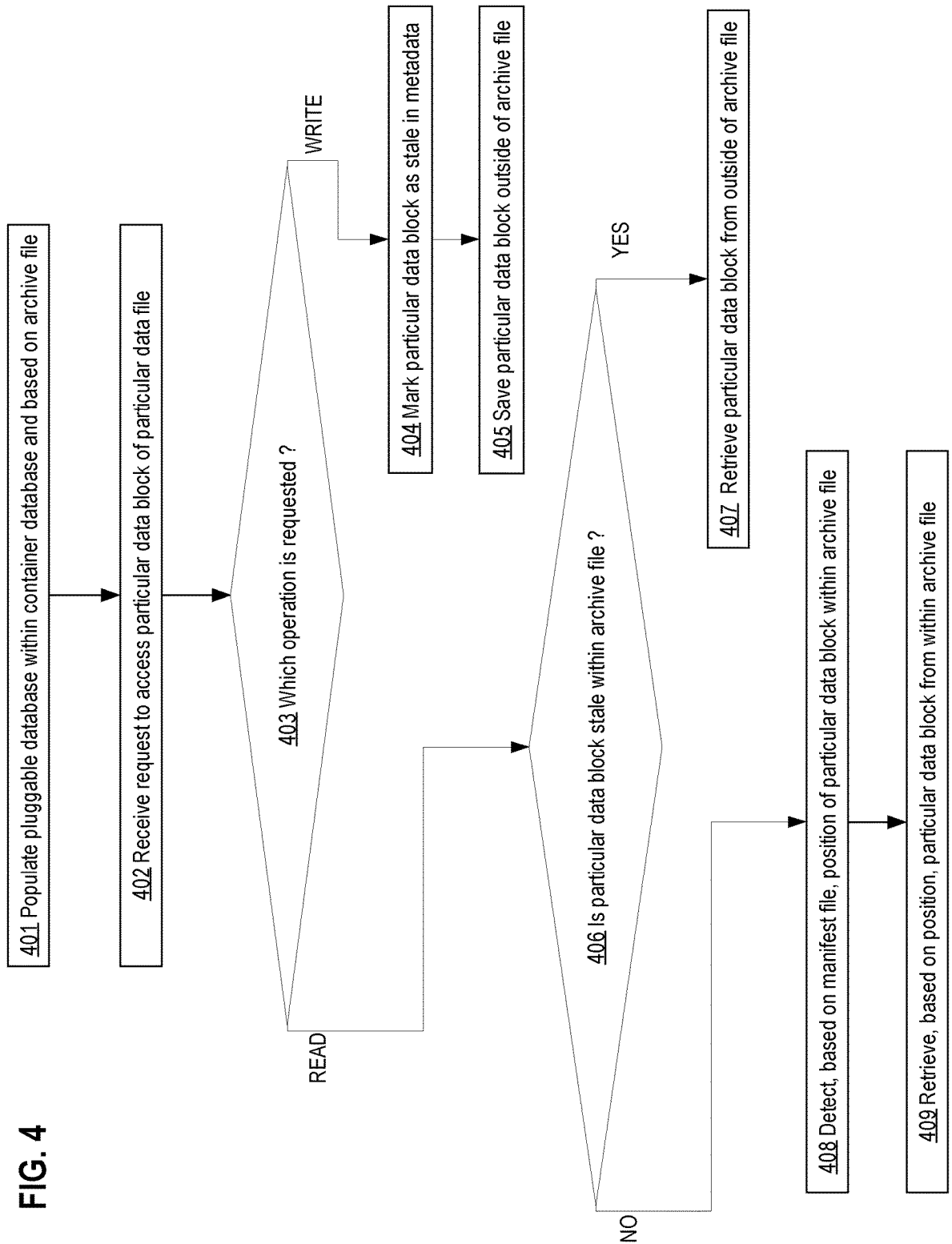
FIG. 4 is a flow diagram that depicts an example process that provides random access into a target pluggable database for data blocks within an archive file, in an embodiment.

FIG. 4 is a flow diagram that depicts an example process that provides random access into a target pluggable database for data blocks within an archive file. FIG. 4 is discussed with reference to FIG. 3.

Step 401 is preparatory. A pluggable database within a container database is created based on an archive file. For example, pluggable database 390 is created from archive file 330. Creation of a target pluggable database from an archive file is discussed above in more detail for FIG. 2.

Steps 402-409 involve random access. In step 402, a request to access a particular data block of a particular data file is received. For example, the database server receives access request 350 that indicates data block 340 of particular data file 310.

For example, the database server may receive a database command or statement, such as a structured query language (SQL) select statement or other query. Query execution may cause the database server to generate access request 350. For example, data block 340 may be needed during a table scan through particular data file 310.

In a read-only embodiment, archive file 330 may be read only. As such, access request 350 is a read request. In such an embodiment, steps 403-407 may be omitted, and the database server proceeds directly to step 408 after step 402.

In step 403, the access request is detected as a read request or a write request. For example, the database server detects that access request 350 specifies an update to be written into data block 340.

Which step follows step 403 depends on whether a read or write was detected in step 403. If a write is detected, then step 403 is directly followed by step 404. Otherwise, a read is detected, and step 403 is directly followed by step 406.

In step 404, the particular data block is marked within the metadata as stale. For example, metadata 395 may contain a bitmap.

Archive file 330 may contain data blocks, such as 340, in a particular order. That ordering of data blocks may match the ordering of bits within the bitmap.

The database server may use those orderings of bits or data blocks to detect which particular bit corresponds to data block 340 that is specified by access request 350. The database server may set the particular bit to indicate that data block 340 is stale within archive file 330.

If the particular bit was previously set during a prior write, then step 404 may detect this and avoid further manipulation of the particular bit. In that case, processing may proceed to step 405 without redundantly manipulating the particular bit.

In step 405, the particular data block is saved outside of the archive file. For example, the database server may write data block 340 to a data file of pluggable database 390 that is not contained within archive file 330.

In step 406, the particular block is detected as stale or not within the archive file. For example, the database server may detect whether the bit of the bitmap that corresponds to data block 340 is set.

Which step follows step 406 depends on whether the particular data block is stale as detected in step 406. If the particular data block is stale, then step 406 is directly followed by step 407. Otherwise, the particular data block is not stale, and step 406 is directly followed by step 408.

In step 407, the particular data block is retrieved from outside of the archive file. For example, data block 340 is stale within archive file 330. The database server retrieves data block 340 from a data file of pluggable database 390 that is not contained within archive file 330.

In step 408, the particular data block is not stale and may be retrieved from the archive file. The position of the particular data block within an archive file is detected based on the manifest file of the archive file. For example if not already extracted, the database server may extract manifest file 360 from archive file 330.

The database server may the identity of particular data file 310 as a lookup key within the manifest file to retrieve the block offset at which particular data file 310 begins within archive file 330. The database server may add to this block offset the block offset specified by access request 350 to calculate an actual block offset (position 320) at which data block 340 resides within archive file 330.

In step 409, the particular data block is retrieved from within archive file based on the determined position. For example, the database server seeks to position 320 within archive file 330 and then reads data block 340. The database server may use the contents of data block 340 to answer the query for which access request 350 was generated.

8.0 Compression

Figure 5:
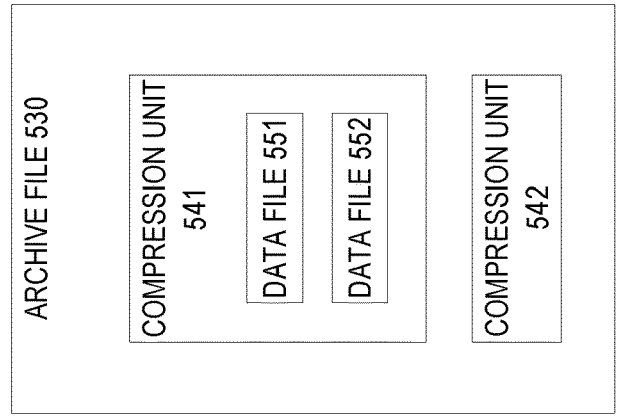
FIG. 5 is a block diagram that depicts an example computer that compresses an archive file, in an embodiment.

FIG. 5 is a block diagram that depicts an example computer 500 that compresses an archive file, in an embodiment. Computer 500 includes archive file 530 that is created from a source pluggable database.

In an embodiment, archive file 530 is itself compressed as a whole according to a compression scheme, such as zipping or dictionary encoding. In an embodiment, parts within archive file 530 are individually compressed.

For example, archive file contains data files 551-552. These data files may be individually compressed according to a compression scheme, such as zipping or dictionary encoding.

In an embodiment, data within archive file 530 is compressed in parts, such as compression units 541-542. Each of compression units 541-542 is individually compressed.

In an embodiment, compression units have a same fixed size. In an embodiment, the fixed size is an amount of uncompressed data before compression. In an embodiment, the fixed size is an amount of compressed data after compression.

In an embodiment, the fixed size is small, which takes less time to decompress. In an embodiment, the fixed size is large, so that archive file 530 needs fewer compression units. Because of metadata storage for each compression unit, fewer compression units makes archive file 530 smaller.

Data files that are smaller than a compression unit, such as 551-552 may be combined into a same compression unit, such as 541. A data file that is too big for one compression unit may be split across multiple compression units.

In an embodiment, all compression units or data files are compressed according to a same compression scheme. In an embodiment, each compression unit or data file is compressed according to whichever compression scheme achieves the most compression for that unit or data file.

Archive file 530 may be used to create a target pluggable database. In an embodiment, data files 551-552 are eagerly extracted from archive file 530 while creating the target pluggable database. Upon extraction, copies of data files 551-552 may be cached in memory or disk by the target database server.

In an embodiment, each individual data file is lazily extracted only when actually needed and then cached to memory or disk. In an embodiment, a compression unit, such as 541-542, is the unit of extraction or caching.

That is, access of any block within compression unit 541 may involve extraction and decompression of other blocks or files within that compression unit. For example, seeking to the middle of data file 552 may entail decompressing the first half of data file 552 and possibly all of data file 551.

Depending on the embodiment, cached data may be compressed, uncompressed, or some of both.

Data files 551-552 contain data blocks. In an embodiment, a data block is the unit of extraction or caching.

The size of data files 551-552 depend on whether or not they are compressed. At what offset is a desired data block within data file 551 may be retrieved from depends on whether data file 551 is compressed.

Offsets to data files or data blocks may be contained in a manifest file of archive file 530. In an embodiment, these offsets regard uncompressed data. As such, computer 500 may include decompression as part of seeking.

In an embodiment, data files 551-552 are compressed, but archive file 530 is not. The manifest file may list an offset to the beginning of each of data files 551-552 relative to archive file 530.

For example, computer 500 may detect, within the manifest file, that data file 552 resides at a position that is 100 blocks into archive file 530. Computer 500 may seek to that position.

Prepended to data file 552 at that position may be metadata that indicates which compressed blocks of data file 552 contain which logical (uncompressed) data blocks or at what position within compressed data file 552 does a given block reside. The metadata may also indicate a compression scheme for data file 552.

In an embodiment, neither the manifest file nor archive file 530 are compressed, which facilitates clear text searches within the manifest file. For example, the presence or absence of data file 552 within archive file 530 may be confirmed with a grep command upon archive file 530.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
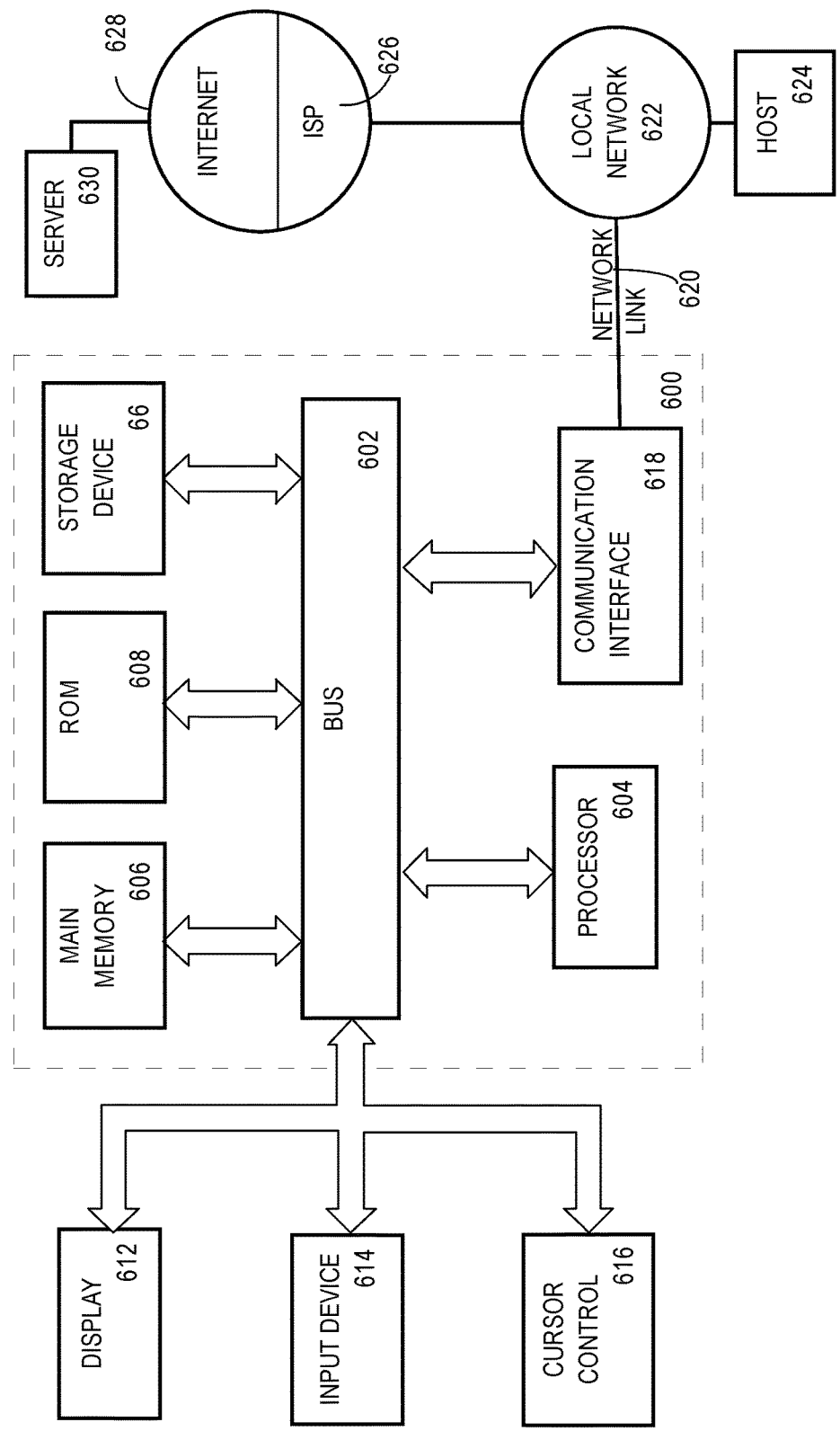
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 66, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 66. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 66. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 66 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 66, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   inserting, by a source database server of a source container database, into a single archive file:
   a plurality of data files that contain a plurality of records from a source pluggable database of the source container database,
   a listing of the plurality of data files,
   one or more downgrade scripts, and
   a list of release patches that were applied to the source pluggable database;
   creating, based on the single archive file, a target pluggable database within a target container database;
   retrieving, by a target database server of the target container database, the list of release patches from the single archive file;
   detecting, by the target database server, that a release patch in the list of release patches was not applied in the target container database;
   executing, after said creating the target pluggable database and based on said detecting that said release patch was not applied in the target container database, at least one of the one or more downgrade scripts to downgrade the target pluggable database.

2. The method of claim 1 wherein the single archive file is compressed as a whole.

3. The method of claim 1 wherein the at least one of the one or more downgrade scripts comprises data manipulation language (DML).

4. The method of claim 1 wherein the at least one of the one or more downgrade scripts comprises data definition language (DDL) that changes a definition of a custom datatype.

5. The method of claim 1 wherein inserting the list of release patches comprises retrieving release patch metadata from a data dictionary of the source container database or the source pluggable database.

6. A method comprising:
   creating a target pluggable database within a target container database and based on a single archive file that contains: a plurality of data files that contain a plurality of records, and a manifest file that lists the plurality of data files, wherein the target pluggable database comprises metadata that identifies which data blocks within the single archive file are stale;
   receiving a request to access a particular data block of a particular data file of the plurality of data files;
   deciding, by a database server of the target container database, whether to retrieve the particular data block from inside or outside of the single archive file;
   detecting, based on the manifest file, a position of the particular data block within the single archive file;
   retrieving, based on the position, the particular data block from within the single archive file;
   responsive to receiving a second request to access a given data block, performing:
   detecting, based on the metadata, that the given data block is stale within the single archive file;
   retrieving, based on detecting that the given data block is stale, the given data block from a data file of the target pluggable database that is outside of the single archive file.

7. The method of claim 6 wherein:
   the metadata comprises a bitmap;
   each bit of the bitmap is associated with a respective data block within the single archive file;
   each bit of the bitmap indicates whether the respective data block is stale within the single archive file;
   detecting that the given data block is stale comprises:
   detecting that the given data block is associated with a particular bit of the bitmap, and
   detecting that the particular bit has a particular value.

8. The method of claim 6 wherein each data file of the plurality of data files is individually compressed.

9. The method of claim 6 wherein:
the single archive file comprises a plurality of compression units;
each compression unit of the plurality of compression units of the single archive file is individually compressed and comprises at least one data file.

10. The method of claim 9 wherein each compression unit of the plurality of compression units has a same fixed size.

11. The method of claim 6 wherein:
detecting the position of the particular data block comprises:
  detecting the position of the particular data file within the single archive file, and
  retrieving, from the single archive file and based on the position of the particular data file, metadata that associates the particular data block with a particular position within the particular data file;
retrieving the particular data block comprises retrieving the particular data block from the particular position within the single archive file.

12. A system comprising a hardware processor and:
a first computer configured to
  insert into a single archive file: a plurality of data files that contain a plurality of records from a source pluggable database, a listing of the plurality of data files, one or more downgrade scripts, and a list of release patches that were applied to the source pluggable database;
a second computer configured to:
  create, based on the single archive file, a target pluggable database within a target container database;
  retrieve the list of release patches from the single archive file,
  detect that a release patch in the list of release patches was not applied in the target container database, and
  execute, after said creating the target pluggable database and based on said detecting that said release patch was not applied in the target container database, at least one of the one or more downgrade scripts to downgrade the target pluggable database.

13. A database server device comprising a hardware processor and
one or more durable storages configured to store a target pluggable database within a target container database and a single archive file that contains: a plurality of data files that contain a plurality of records, and a listing of the plurality of data files wherein the target pluggable database comprises metadata that identifies which data blocks within the single archive file are stale;
wherein the hardware processor is connected to the durable storage and configured to:
  create the target pluggable database based on the single archive file;
  receive a request to access a particular data block of a particular data file of the plurality of data files;
  decide, by the database server device, whether to retrieve the particular data block from inside or outside of the single archive file;
  detect, based on the listing of the plurality of data files, a position of the particular data block within the single archive file;
  retrieve, based on the position, the particular data block from within the single archive file;
  responsive to receiving a second request to access a given data block, performing:
    detecting, based on the metadata, that the given data block is stale within the single archive file;
    retrieving, based on detecting that the given data block is stale, the given data block from a data file of the target pluggable database that is outside of the single archive file.

14. One or more non-transitory computer-readable media that store instructions that, when executed by one or more processors, cause:
inserting into a single archive file: a plurality of data files that contain a plurality of records from a source pluggable database of a source container database, a listing of the plurality of data files, one or more downgrade scripts, and a list of release patches that were applied to the source pluggable database;
creating, based on the single archive file, a target pluggable database within a target container database;
retrieving, the list of release patches from the single archive file;
detecting that a release patch in the list of release patches was not applied in the target container database;
executing, after said creating the target pluggable database and based on said detecting that said release patch was not applied in the target container database, at least one of the one or more downgrade scripts to downgrade the target pluggable database.

15. The one or more non-transitory computer-readable media of claim 14 wherein inserting the list of release patches comprises retrieving release patch metadata from a data dictionary of the source container database or the source pluggable database.

16. One or more non-transitory computer-readable media that store instructions that, when executed by one or more processors, cause:
creating a target pluggable database within a target container database and based on a single archive file that contains: a plurality of data files that contain a plurality of records, and a manifest file that lists the plurality of data files, wherein the target pluggable database comprises metadata that identifies which data blocks within the single archive file are stale;
receiving a request to access a particular data block of a particular data file of the plurality of data files;
deciding whether to retrieve the particular data block from inside or outside of the single archive file;
detecting, based on the manifest file, a position of the particular data block within the single archive file;
retrieving, based on the position, the particular data block from within the single archive file;
responsive to receiving a second request to access a given data block, performing:
  detecting, based on the metadata, that the given data block is stale within the single archive file;
  retrieving, based on detecting that the given data block is stale, the given data block from a data file of the target pluggable database that is outside of the single archive file.

17. The one or more non-transitory computer-readable media of claim 16, wherein:
detecting the position of the particular data block comprises:
  detecting the position of the particular data file within the single archive file, and
  retrieving, from the single archive file and based on the position of the particular data file, metadata that associates the particular data block with a particular position within the particular data file;

retrieving the particular data block comprises retrieving the particular data block from the particular position within the single archive file.

18. The one or more non-transitory computer-readable media of claim 16 wherein:
the metadata comprises a bitmap;
each bit of the bitmap is associated with a respective data block within the single archive file;
each bit of the bitmap indicates whether the respective data block is stale within the single archive file;
detecting that the given data block is stale comprises:
    detecting that the given data block is associated with a particular bit of the bitmap, and
    detecting that the particular bit has a particular value.

19. The method of claim 9 wherein at least one compression unit of the plurality of compression units of the single archive file comprises multiple data files.

* * * * *